No. 11,778. Reissued Oct. 24, 1899.

A. FRESCHL.

APPARATUS FOR TUFTING CUSHIONS.

(Application filed June 28, 1899.)

Witnesses:
A. J. Bell
Harry Flatow

Inventor:
Alfred Freschl,
by Josiah McRoberts
his Atty.

UNITED STATES PATENT OFFICE.

ALFRED FRESCHL, OF CHICAGO, ILLINOIS.

APPARATUS FOR TUFTING CUSHIONS.

SPECIFICATION forming part of Reissued Letters Patent No. 11,778, dated October 24, 1899.

Original No. 620,070, dated February 21, 1899. Application for reissue filed June 28, 1899. Serial No. 722,189.

DIVISION A.

*To all whom it may concern:*

Be it known that I, ALFRED FRESCHL, of Chicago, in the county of Cook and State of Illinois, have invented certain new and useful Improvements in Apparatus for Tufting Cushions; and I do hereby declare that the following is a full, clear, and exact description thereof, reference being had to the accompanying drawings, and to the letters of reference marked thereon, which form a part of this specification.

This invention relates to an improved apparatus for making tufted cushions for use in upholstering; and the object of the invention is to simplify and lessen the cost of the apparatus used in the manufacture of such cushions.

The invention consists in the matters hereinafter set forth, and more particularly pointed out in the appended claims.

Figure 1:
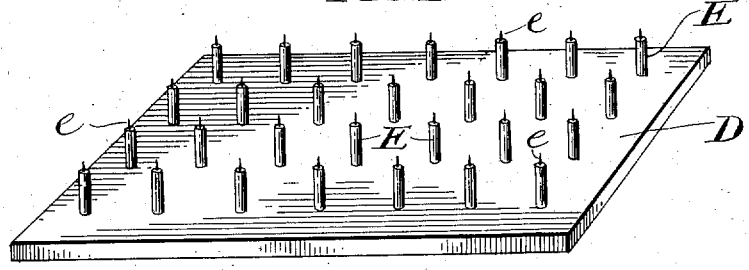
Figure 2:
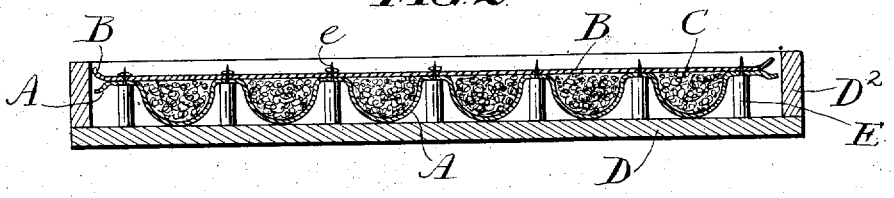
Figure 3:
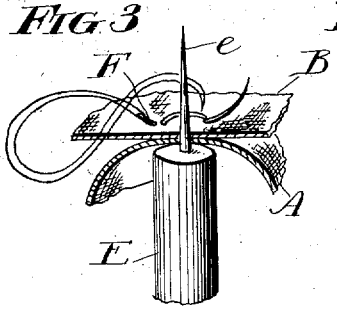
Figure 4:
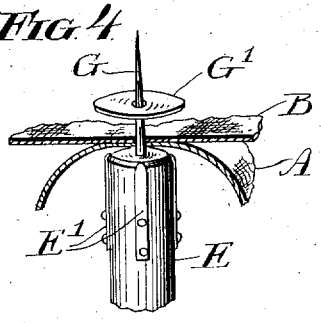
Figure 5:
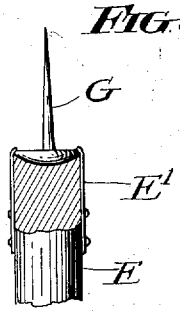
Figure 6:
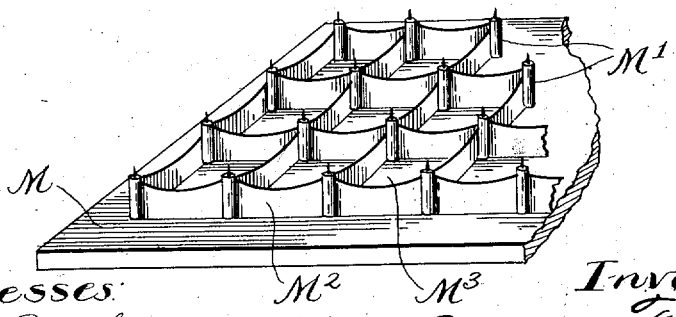

In the drawings, Figure 1 is a perspective view of one form of base over which the cushion is molded or formed by hand. Fig. 2 shows in sectional view the cushion in the mold or former before the same has been completed. Fig. 3 shows one means of securing the outer and inner coverings of the cushion together at the tufts. Figs. 4 and 5 illustrate details of another manner of securing said inner and outer coverings together, and Fig. 6 illustrates a modified form of the former or mold shown in Fig. 1.

A cushion which my invention is adapted to produce consists of an upper or outer covering A, of cloth, leather, or the like, a lower covering or backing B, of burlap, cardboard, or other suitable material, and a filling C, of hair, moss, or like material. Said filling is divided into a number of elevated rounded projections, the outer and inner coverings being secured together between said elevations at the base of the cushion, thereby forming on the outer surface of the cushion a plurality of depressions, in which are usually located buttons or tufts. The outer edges of the cushion will be finished in any manner to suit the use to which it is to be put.

Referring first to the construction shown in Figs. 1, 2, and 3, D designates a base plate or board, which may be of any desired form to correspond with the form of the cushion to be made thereon. Said base-board is provided with a plurality of upwardly-projecting posts E, which are spaced upon the upper surface thereof to correspond with the number and location of the depressions in the cushion and which are arranged opposite the points in the cushion in which the inner and outer coverings are secured together in tufting. Each of said posts is provided on its upper end with one or more pointed upwardly-projecting pins *e*. In practice the base-board will form the bottom of an open-top box having vertical side and end walls $D'$ $D^2$, respectively.

The method of making a cushion with the apparatus described is as follows: The flexible material forming the upper or outer covering A of the cushion is placed with its finished face downward on the base-board over the pins *e*. Said outer covering is then pressed or drawn downwardly in the spaces between the posts, which constitute, in effect, separate molds or pockets, thereby forming in the upper surface of said outer covering between the posts E a plurality of cells in which the filling C is to be pressed. Said outer covering will desirably be previously provided with a plurality of apertures through which the pins *e* are adapted to project or provided on its inner surface with marks to indicate where the pins should pierce therethrough. With this arrangement said cover may be pressed down over all the pins at once and thereafter depressed between the posts to form all the cells before the filling is begun. When the cells have been formed in the manner described, they will be severally filled by hand with the material used for that purpose, said filling being pressed into the cells to produce the required firmness and compactness in the cushion. Said cells may all be filled at once and the inner covering or backing B applied to the same and independently secured over the different cells, or each cell may be filled and the backing or inner covering secured thereover before filling the next adjacent cell, and so on until all the cells are completed, any order in filling said cells being followed, as most convenient to the operator. Said inner covering or backing when pressed down over the pins is in contact with the outer covering at the points opposite said posts, and the two coverings are secured or tufted together at said points of contact by any suitable tufting or attaching means. As shown in Fig. 3, said coverings are sewed together by a strong cord or thread, which is passed through both thicknesses of material and is inserted from the upper side thereof by means of a curved needle F. Instead of sewing, as described, the two coverings may, however, be secured together by means of headed tufting pins or nails G, passing through both coverings and through apertured disks or washers G'. When such tufting-pins are employed, they will be attached to the outer ends of the posts E, with their points directed outwardly and in extension of said posts. Said nails or pins will be secured upon the posts by any suitable means affording detachable connection by which they will be held rigidly thereon and serve the same purpose as the pins *e*. When thus attached, said nails or pins G serve to hold the layers or coverings in their proper relation before the covers are permanently secured together. In Figs. 4 and 5 is shown one means for detachably connecting the tufting nails or pins to the posts. Said posts are in this instance provided with a plurality of spring-arms E', which project beyond the ends of the posts and are curved inwardly in their projecting portions to form seats and embrace the heads of said nails or pins with a yielding pressure. When said inner and outer coverings have been secured together in the manner described, the outer margins will be suitably finished to suit the use to which the cushion is to be put. All of the operations of making a cushion by the use of the devices described are performed by hand. Said outer covering may be tucked about the posts, if desired, by the use of the tucking-peg shown in my prior patent, No. 592,508, granted to me October 26, 1897.

In Fig. 6 is shown a modification of the form of base-board for the mold or former. Said board, which is designated by the letter M, is provided on its upper surface between the upwardly-projecting posts M' (which latter may be provided either with the pins *e* or the detachable tufting nails or pins G, above described) with a plurality of strips $M^2$, which are set edgewise on the board, longitudinally and transversely thereof, and intersect each other at said posts, thereby forming on said base-plate a plurality of separate molds or pockets $M^3$, within which the outer covering of the cushion may be depressed to form the cells therein. Said pockets or molds enable the cells to be formed with greater accuracy than when said strips or partitions are absent. Said construction of the base-board may be used with the device shown in Fig. 2.

The employment of the pins attached to the upwardly-projecting posts of the base of the mold or former is of great importance, as it enables the outer covering of the cushion to be held in fixed relation upon the base-plate of the mold while it is being depressed into the pockets or molds to form the cells for the filling. At the same time said pins hold said covering in position while the filling is being placed therein and while the inner covering or backing is being attached to said outer covering. The pins effectually prevent displacement of the parts while the cushion is being upholstered, as they are held against lateral movement or displacement. By the use of said pins in connection with the posts described the cells of the cushion may be independently and successively filled and the inner covering or backing attached thereto as each cell is filled when the device shown in Fig. 2 is employed. Moreover, this feature of the invention affords a construction which is exceedingly simple and cheap and greatly simplifies the operation of manufacturing such cushions, because it enables the material forming the outer surface of the cushion to be held in fixed relation upon the base-plate of the former while it is being depressed into the pockets or molds to form the cells for the filling and holds said covering in position while the filling is being placed therein and while the inner covering or backing is being attached to said outer covering without the necessity of using auxiliary holding devices for these purposes.

The use of the upwardly-projecting tufting-posts, which are attached directly to the base-plate of the former and provided at their outer ends with pins which are adapted to pierce the inner and outer coverings of the cushion and hold the same firmly in place during the operation of making the cushion, is of much importance, as it greatly simplifies the construction of the apparatus and the operation thereof. With this construction the posts themselves serve to divide or separate the cells, thereby obviating the necessity of employing for this purpose separate tubes, through which the tufting nails or pins or other fastening devices are inserted, as in prior devices of this character.

The base-plate of the moldboard is imperforate or solid, and the tufting devices, which may be of any of the various well-known forms, are placed thereon in any suitable manner and in any desirable pattern. By employing a moldboard having an imperforate base-plate provided with cell-forming or tufting devices a cushion may be manually made either by sewing the outer and inner coverings together or by uniting them by the common clench-nail or tuft-button. The terms "imperforate" and "solid" are used to distinguish the moldboard herein disclosed from that type of apparatus in which a separate pin-board is associated with the moldboard and in which the moldboard is provided with passages in its base-plate for the clench-buttons that are carried by the pin-board when a tuft-button cushion is to be made, these terms being here employed and applied to mean that the mold or former is not provided with passages for the tufting means. In this latter type of apparatus the clench-button cushion is the product of mechanical factors, while in my present apparatus it is hand-made, and this additional capacity of the present apparatus to make as well clench-button cushions as sewed cushions is due to the fact that the old form of perforated moldboard is here replaced by a new form of imperforate or solid moldboard.

By employing a moldboard or former having a solid-bottomed or imperforate base-plate, to which the tufting and button-holding posts are attached, the entire operation of making a cushion provided with tufting-buttons having shanks or nails or pins, as distinguished from a cushion in which the buttons are merely sewed through the material, may be performed manually. When the old form of apparatus is employed to make a cushion having tufting nails or pins, the former or moldboard is provided with a perforated base-plate, and tubular or hollow cell-forming or tufting devices surround the perforations, and it is necessary to employ also a pin-board separate and distinct from the moldboard and which carries the tufting-nails, which are guided by the hollow or tubular tufting devices to pierce the material. In the latter case a cushion of the character described may be made only by the employment of mechanical power, such being necessary to operate the pin-board to force the tufting nails or buttons through the material. By my present invention the construction and operation of the apparatus are so simplified that the entire work may be done manually. The cell-forming or tufting devices being mounted upon an imperforate moldboard at once serve as tufting devices and as supports for the detachable tufting nails or pins.

Having thus described my invention, what I claim as new, and desire to secure by Letters Patent, is—

1. A former for making tufted cushions, comprising an imperforate base-plate, and a plurality of upwardly-projecting tufting-posts attached rigidly to said plate, each of said posts being provided at its outer end with an upwardly-projecting pointed pin held against lateral displacement and adapted to pierce both coverings of the cushion.

2. A former for making tufted cushions comprising an imperforate base-plate, a plurality of upwardly-projecting tufting-posts attached rigidly to said plate, each of said posts being provided at its outer end with an outwardly-projecting pointed pin held against lateral displacement and adapted to pierce both coverings of the cushion, and a plurality of strips placed edgewise on the plate longitudinally and transversely thereof and intersecting at said posts to form between said posts a plurality of outwardly-opening pockets.

3. A former for making tufted cushions, comprising a solid-bottomed base-plate, and a plurality of upwardly-projecting tufting-posts attached rigidly to said plate, each of said posts being provided at its outer end with an upwardly-projecting pin or nail held against lateral displacement and adapted to pierce both coverings of the cushion, said pin or nail being detachably connected with the post and adapted to be detached therefrom and serve as a means for tufting the inner and outer coverings together.

4. A former for making tufted cushions, comprising a solid base-plate, and a plurality of upwardly-projecting tufting-posts attached rigidly to said plate, each of said posts being provided at its outer end with a seat for the head of an upwardly-projecting tufting-pin, said seat adapted to retain the pin against displacement during the process of forming the cushion and adapted to release the pin when the cushion is removed from the mold.

ALFRED FRESCHL.

Witnesses:
JOSIAH MCROBERTS,
LYNDEN EVANS.